(12) United States Patent
Chang

(10) Patent No.: US 10,773,655 B1
(45) Date of Patent: Sep. 15, 2020

(54) VEHICLE ROOF RACK STRUCTURE

(71) Applicant: STRONA INDUSTRIAL INC., Kaohsiung (TW)

(72) Inventor: Pu-Lun Chang, Kaohsiung (TW)

(73) Assignee: STRONA INDUSTRIAL INC., Kaohsiung (TW)

( * ) Notice: Subject to any disclaimer, the term of this patent is extended or adjusted under 35 U.S.C. 154(b) by 0 days.

(21) Appl. No.: 16/412,544

(22) Filed: May 15, 2019

(51) Int. Cl.
*B60R 9/058* (2006.01)
*B60R 9/048* (2006.01)

(52) U.S. Cl.
CPC .............. *B60R 9/058* (2013.01); *B60R 9/048* (2013.01)

(58) Field of Classification Search
CPC B60R 9/04; B60R 9/052; B60R 9/058; Y10T 24/2172; Y10T 24/2185; Y10T 24/44598
See application file for complete search history.

(56) References Cited

U.S. PATENT DOCUMENTS

| | | | | |
|---|---|---|---|---|
| 4,736,878 A * | 4/1988 | Rasor | ...................... | B60R 9/045 224/321 |
| 5,226,570 A * | 7/1993 | Pedrini | ................... | B60R 9/058 224/315 |
| 5,464,140 A * | 11/1995 | Hill | ......................... | B60R 9/045 224/315 |
| 5,582,044 A * | 12/1996 | Bolich | ...................... | B60R 9/08 224/315 |
| 5,730,343 A * | 3/1998 | Settelmayer | ............ | B60R 9/045 224/321 |
| 5,758,810 A * | 6/1998 | Stapleton | ................ | B60R 9/045 224/321 |
| 5,769,292 A * | 6/1998 | Cucheran | ................ | B60R 9/045 224/319 |
| 5,806,735 A * | 9/1998 | Christiansson | ......... | B60R 9/045 224/319 |
| 5,931,359 A * | 8/1999 | Zona | ....................... | B60R 9/045 224/319 |
| 6,370,741 B1 * | 4/2002 | Lu | ......................... | A47B 21/045 24/523 |
| 6,622,898 B1 * | 9/2003 | Wang | ...................... | B60R 9/045 224/321 |
| 7,386,922 B1 * | 6/2008 | Taylor | ..................... | E04D 13/10 24/525 |
| 8,021,169 B1 * | 9/2011 | Smith | ...................... | H01R 4/36 439/100 |

(Continued)

*Primary Examiner* — Brian D Nash
(74) *Attorney, Agent, or Firm* — WPAT, PC

(57) ABSTRACT

A vehicle roof rack structure includes a first clamp assembly, a second clamp assembly and a driving member. The first clamp assembly has a first positioning member. The second clamp assembly, aside to the first clamp assembly, has a second positioning member with a second-clamp-assembly bevel surface. The driving member for driving the second clamp assembly includes a screw bar, a driving block and a vehicle-roof bar. The screw bar engages the first and the second positioning members. The driving block, engaging the screw bar, has a driving-block bevel surface to contact the second-clamp-assembly bevel surface. The vehicle-roof bar has an end to mount the first and the second clamp assemblies. When the screw bar rotates, the screw bar drives the driving block to drive the first and the second clamp assemblies to clamp or release the vehicle-roof mounting rack in between.

8 Claims, 9 Drawing Sheets

(56) References Cited

U.S. PATENT DOCUMENTS

| | | | | |
|---|---|---|---|---|
| 8,444,033 B2 * | 5/2013 | Brochier | ............... | B60R 9/048 |
| | | | | 224/315 |
| 8,556,146 B2 * | 10/2013 | Sautter | ................ | B60R 9/08 |
| | | | | 224/325 |
| 9,187,047 B2 * | 11/2015 | Sautter | ................ | B60R 9/048 |
| 9,283,884 B2 * | 3/2016 | Sautter | ................ | B60R 9/04 |
| 9,695,977 B2 * | 7/2017 | Blalock | ............... | F16M 13/022 |
| 9,896,034 B2 * | 2/2018 | Ward | ................ | B60R 9/045 |
| 10,543,771 B2 * | 1/2020 | Sautter | ................ | B60P 3/34 |
| 2011/0139841 A1 * | 6/2011 | Sautter | ................ | B60R 9/055 |
| | | | | 224/324 |
| 2014/0143990 A1 * | 5/2014 | Sautter | ................ | B60R 9/04 |
| | | | | 24/68 CD |
| 2014/0224850 A1 * | 8/2014 | Lundgren | ............ | B60R 9/058 |
| | | | | 224/322 |
| 2015/0175082 A1 * | 6/2015 | Aftanas | ................ | B60R 9/058 |
| | | | | 224/309 |
| 2016/0280143 A1 * | 9/2016 | Sato | ................ | B60R 9/045 |
| 2016/0348835 A1 * | 12/2016 | Blalock | ............... | F16M 13/04 |

* cited by examiner

VEHICLE ROOF RACK STRUCTURE

TECHNICAL FIELD

The present disclosure relates in general to a vehicle roof rack structure, and more particularly to the vehicle roof rack structure that is furnished with an anti-self-locking sliding pair for effectively locking and easily assembling/disassembling.

BACKGROUND

In the art, the conventional vehicle roof rack structure is formed by a plurality of crossed bars including longitudinal bars and transverse bars. The longitudinal bars are mounted to the right and the left rims of a vehicle roof, while each of the transverse bars is structured to connect the two parallel longitudinal bars by crossing spatially the vehicle roof. By providing such a formulation of the longitudinal bars and the transverse bars, a carrier space such as a luggage tray, a luggage box, a carrying frame or a ski rack can be formed for on top or roof of the vehicle.

Referring to Taiwan (R.O.C) Patent Publication Number M267119, a locking structure of a vehicle roof rack structure is disclosed. In this disclosure, a fixation block and a fixation plate are furnished with individual clamping portions. On top of the clamping portion of the fixation block, a slot is structured to mount fixedly a transverse bar. In addition, a plurality of anchoring grooves are disposed under the slot to receive insert protrusions of the fixation plate. By having bolts to screw-fix the fixation plate and the fixation block, the whole assembly can be mounted onto the longitudinal bars via the clamping portions. In particular, the insert protrusions are disposed above the clamping portion, and screw holes for engaging the bolts are disposed under the clamping portions. While the clamping portions are applied to fix the longitudinal bars, the bolts penetrate through the fixation block to engage the fixation plate. By having the fixation block and the fixation plate to clamp firmly the corresponding longitudinal bar, two opposing ends of the transverse bar are located into the corresponding slots of the fixation blocks, the bolts then penetrate the respective fixation blocks to further engage the corresponding ends of the transverse bar, and thus the transverse bar can be fixed between the two longitudinal bars.

Nevertheless, the aforesaid vehicle roof rack structure does have the shortcomings as follows.

1. Insufficient locking: vulnerable to get loose, and hard to be fixed
2. Inconvenience for assembling: While in assembling the longitudinal bars and the transverse bars, different bolts shall be applied for structural fixation. Namely, during assembling or dis-assembling, many different bolts are required to complete structurally the fixation or locking, from which the inconvenience arises.
3. Extended labor time for assembly and/or dis-assembly: Due to difficulty in assembling/dis-assembling, plenty of labor time is inevitable.

Accordingly, an improved vehicle roof rack structure that can be effectively and sufficiently locked and conveniently assembled/dis-assembled is definitely welcome and urgent to the skill in the art.

SUMMARY

In one embodiment of this disclosure, a vehicle roof rack structure includes:

a first clamp assembly, having a first positioning member;

a second clamp assembly, disposed aside to the first clamp assembly, having a second positioning member, the second positioning member furnished with a second-clamp-assembly bevel surface at a side thereof, wherein a space for passing a vehicle-roof mounting rack is formed between the first clamp assembly and the second clamp assembly; and a driving member, used for driving the second clamp assembly to displace, including:

a screw bar, passing through the first positioning member and the second positioning member;

a driving block, disposed at an axial end of the screw bar, engaging the screw bar with threads, furnished with a driving-block bevel surface to face the second-clamp-assembly bevel surface, the driving-block bevel surface and the second-clamp-assembly bevel surface having approximately the same slope; and a vehicle-roof bar, having an end to mount the first clamp assembly and the second clamp assembly;

wherein, when the screw bar rotates in either direction about a center axis thereof, the screw bar drives the driving block to displace so as to drive or release the second clamp assembly, so that the first clamp assembly and the second clamp assembly clamp or release the vehicle-roof mounting rack in between.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
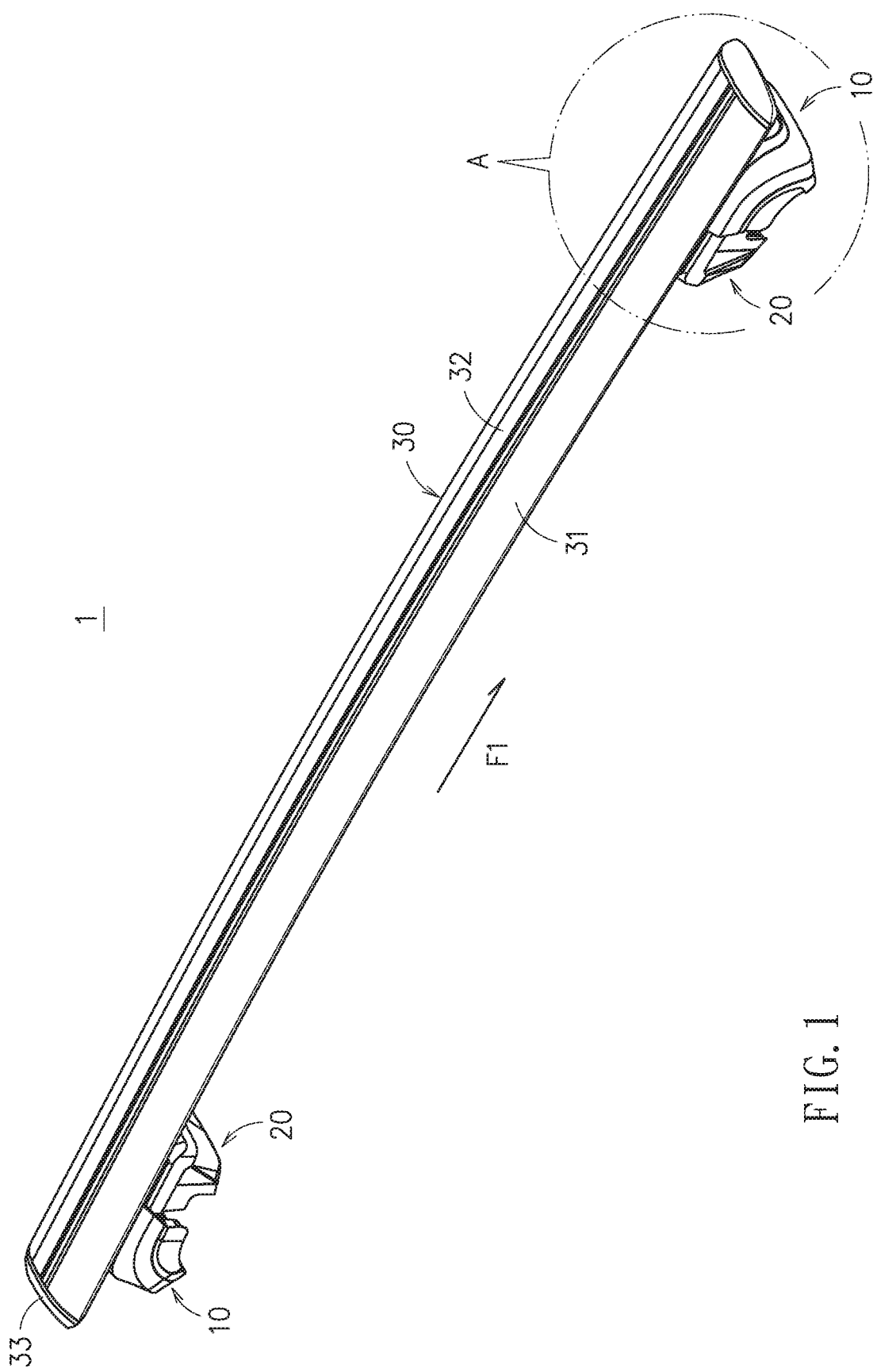
FIG. 1 is a schematic perspective view of an embodiment of the vehicle roof rack structure in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring now to the embodiment shown in FIG. 1, the vehicle roof rack structure 1 includes a vehicle-roof bar 30. Below each end of the vehicle-roof bar 30, a combination consisted of a first clamp assembly 10 and a second clamp assembly 20 are furnished, and the two combinations at opposing ends of the vehicle-roof bar 30 are symmetrically disposed. As shown, in the same combination, the second clamp assembly 20 is disposed aside to the first clamp assembly 10. In the following description, only one combination of the first clamp assembly 10 and the second clamp assembly 2 at one end side of the vehicle-roof bar 30 is raise form concise explanation.

Figure 2:
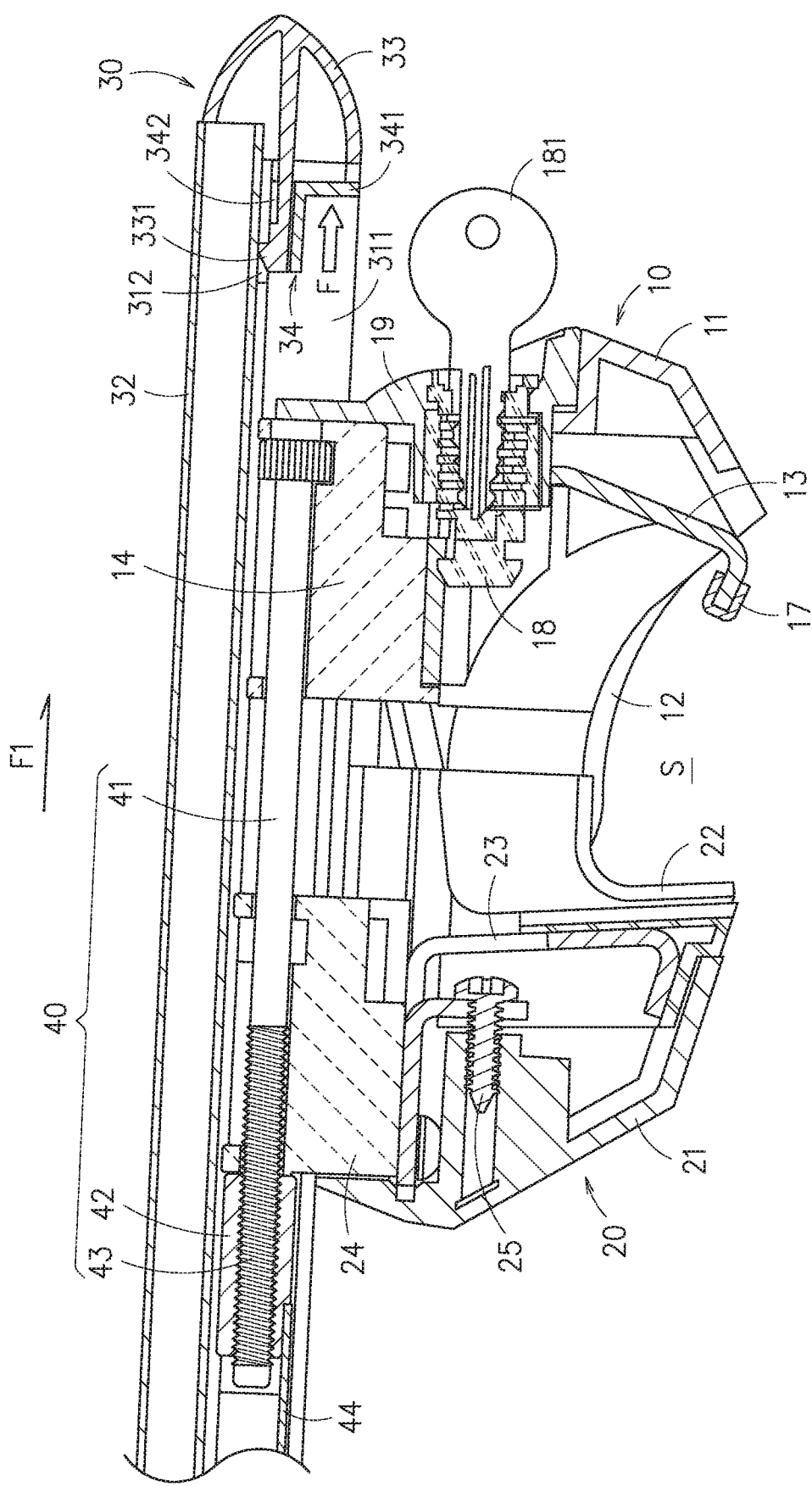
FIG. 2 is a schematic enlarged view of area A of FIG. 1.
Figure 3:
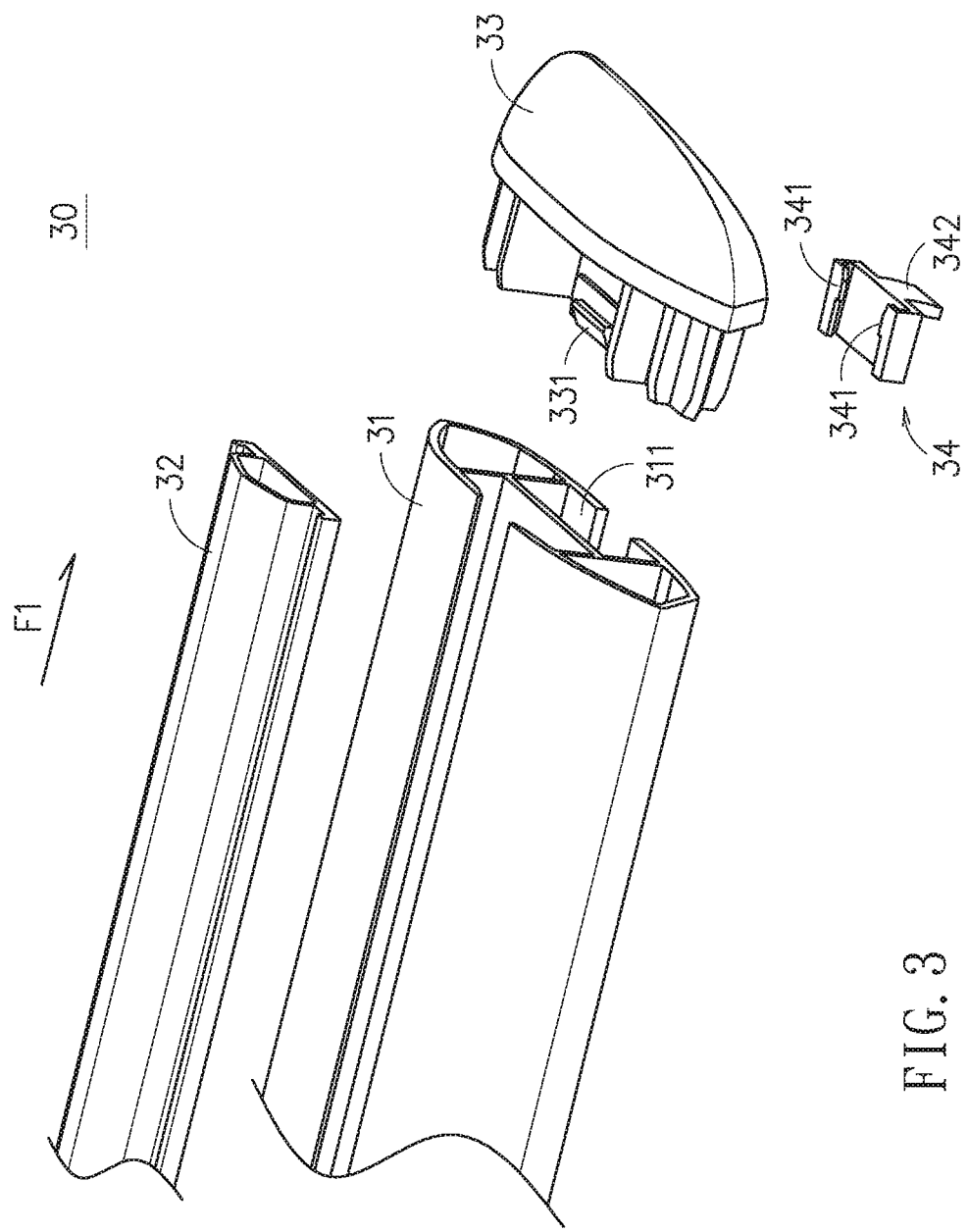
FIG. 3 is a schematic exploded view of FIG. 1.

Referring now to FIG. 1 through FIG. 3, the vehicle-roof bar 30 includes a main bar structure 31, a protective strip 32, and two end caps 33. The main bar structure 31 defines a longitudinal direction F1. An engagement groove 311 is constructed at a side of the main bar structure 31 by extending thereof in the longitudinal direction F1. The protective strip 32, also extending in the longitudinal direction F1, is disposed at another side of the main bar structure 31 by opposing the engagement groove 311. The two end caps 33 are furnished to two opposing axial ends of the main bar structure 31 in the longitudinal direction F1, and each of the two end caps 33 has an anchoring protrusion 331 to be hooked inside a receiving hole 312 of the main bar structure 31.

Referring now to FIG. 2 and FIG. 3, the vehicle-roof bar 30 further includes two fitting members 34 (only one shown in FIG. 2 and FIG. 3), and each of the fitting members 34 is to pair one of the two end caps 33. The fitting member 34 includes two opposing flanges 341 and a middle lip 342. The two flanges 341 are to match the two corresponding anchoring protrusions 331 located at the two respective sides of the end cap 33. As shown, the lip 342 are disposed to a lower middle portion between the two flanges 341. By applying a force F to the lip 342, the two flanges 341 can move synchronously to pull the anchoring protrusions 331 inside the receiving holes 312 so as to retrieve the anchoring protrusions 331 from the respective receiving holes 312 of the main bar structure 31, such that the end cap 33 can be dis-assembled from the main bar structure 31.

In this disclosure, a material for producing the main bar structure 31 can be, but not limited to, a metallic material with substantial stiffness. In addition, the protective strip 32, the end caps 33 and the fitting members 34 can be made of plastic or rubber materials.

Figure 4:
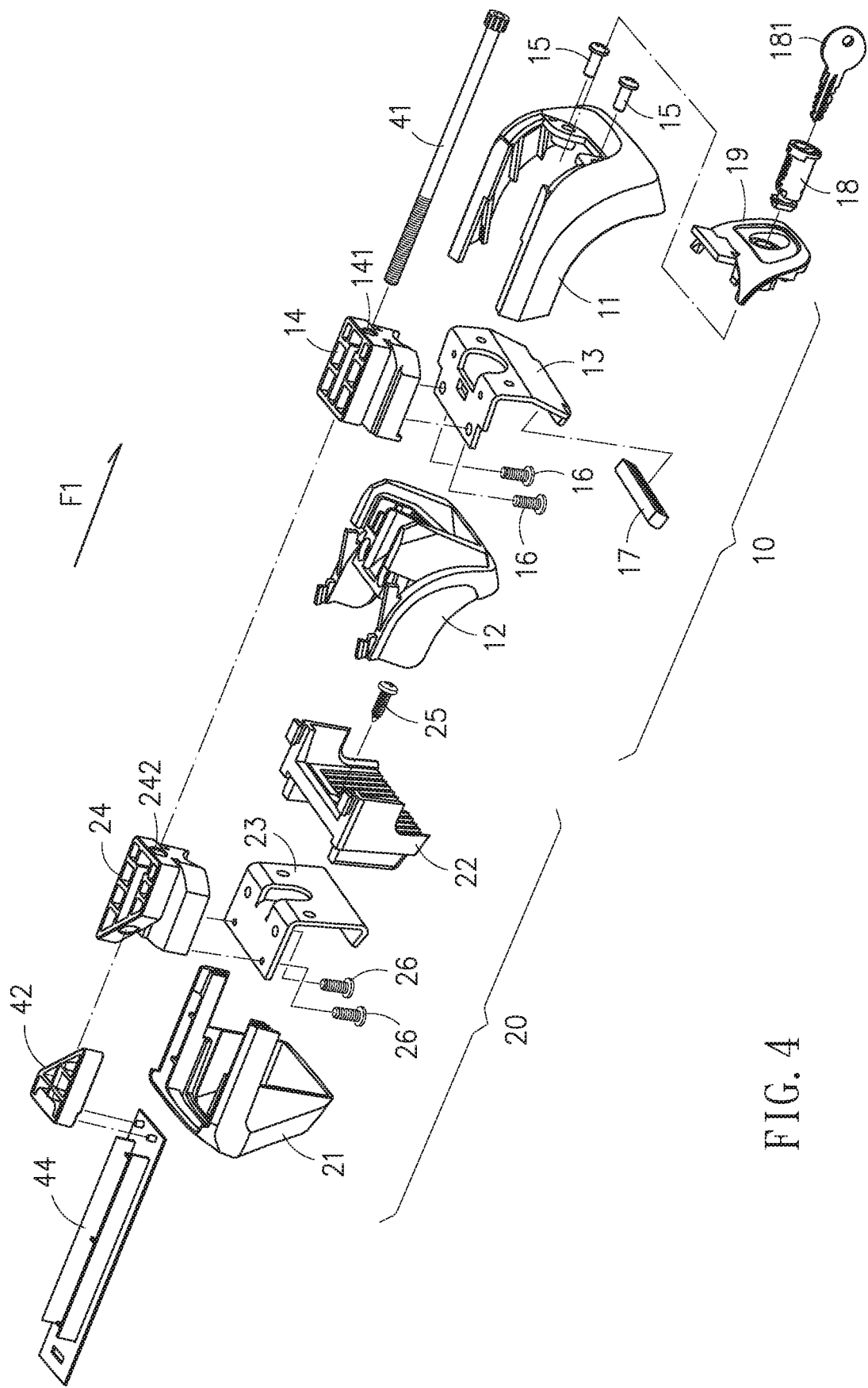
FIG. 4 is a schematic exploded view of the first clamp assembly and the second clamp assembly of FIG. 1.
Figure 5:
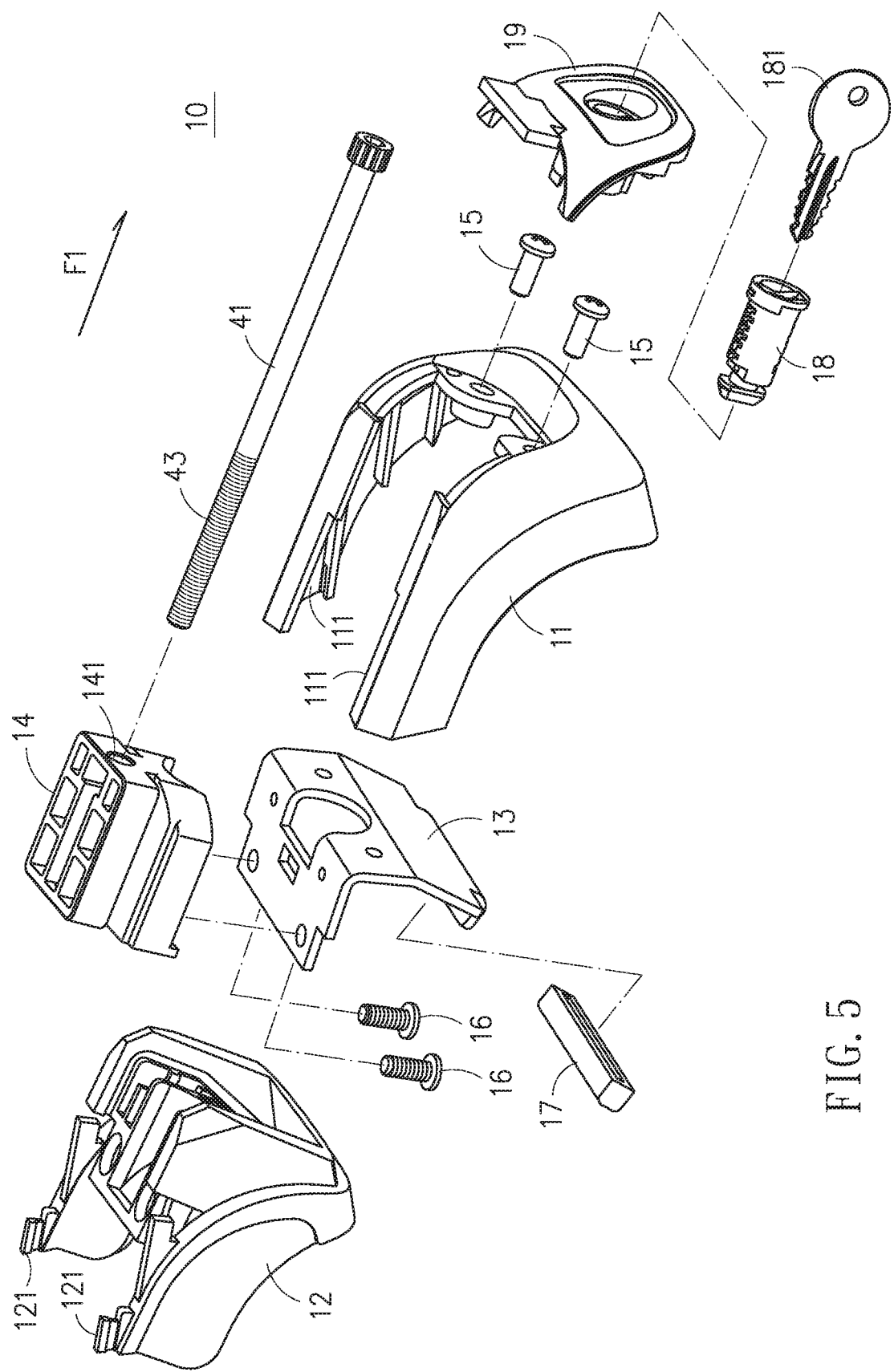
FIG. 5 is a schematic exploded view of the first clamp assembly of FIG. 1 associated with part of a driving member in accordance with this embodiment.

Referring now to FIGS. 2, 4 and 5, the first clamp assembly 10 includes a first outer housing 11, a first inner housing 12, a first supportive member 13 and a first positioning member 14.

The first inner housing 12 and the first outer housing 11 are detachably engaged. In this embodiment, the first inner housing 12 is furnished, on a top thereof, with two opposing sliding protrusions 121 for engaging respective sliding slots 111 located at the first outer housing 11.

The first supportive member 13, to be clamped between the first outer housing 11 and the first inner housing 12, can be screwed to the first outer housing 11 by a plurality of bolts 15 (two shown in this embodiment). The first positioning member 14, disposed on top of the first supportive member 13, protrudes out of the first outer housing 11 and the first inner housing 12, and can be screwed to the first supportive member 13 by a plurality of bolts 16 (two shown in this embodiment). The first positioning member 14 is furnished with a receiving hole 141 for a screw bar 41 to penetrate therethrough. Details about the screw bar 41 would be described later.

The first clamp assembly 10 further includes a protective glove 17, disposed at a side of the first supportive member 13 by opposing the first positioning member 14, protrudes into a space S formed by the first clamp assembly 10 and the second clamp assembly 20. In this embodiment, the space S allows the vehicle-roof mounting rack 50 to pass through (referring to FIG. 9).

In this disclosure, a material for producing the first outer housing 11, the first inner housing 12, the first supportive member 13 and the first positioning member 14 can be, but not limited to, a plastic or rubber material. In addition, the first supportive member 13 can be made of a metallic material with substantial stiffness.

In this embodiment, the first outer housing 11 further includes a lock 18 for pairing a key 181. A shield cover 19, located outside and thus shielding the lock 18 engaged with the first outer housing 11, is applied to shield the first outer housing 11 so as to keep neatly the first clamp assembly 10.

Figure 6:
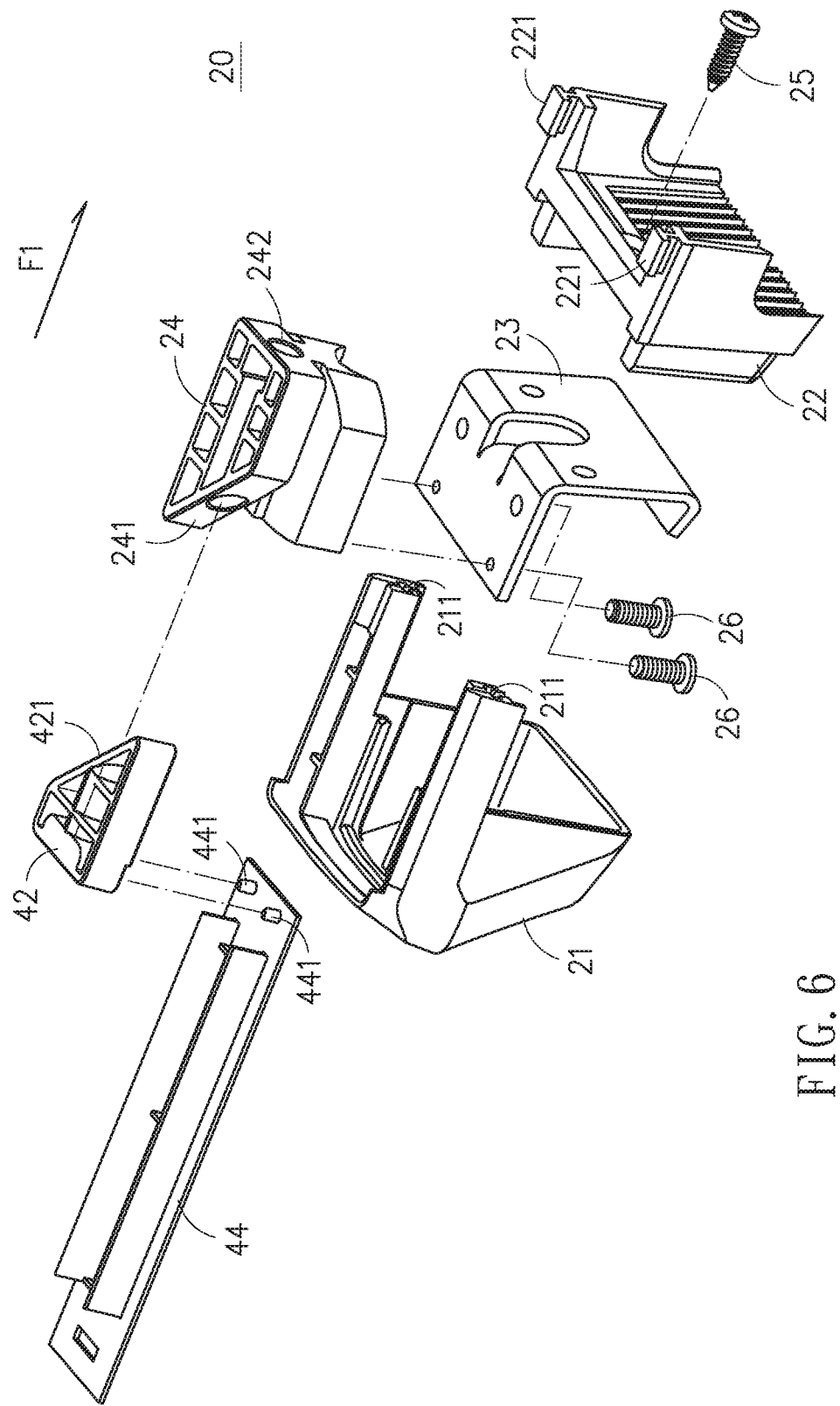
FIG. 6 is a schematic exploded view of the second clamp assembly of FIG. 1 associated with another part of the driving member in accordance with this embodiment.

Referring now to FIGS. 2, 4 and 6, the second clamp assembly 20 includes a second outer housing 21, a second inner housing 22, a second supportive member 23 and a second positioning member 24.

The second inner housing 22 and the second outer housing 21 are detachably engaged. In this embodiment, the second inner housing 22 is furnished, on a top thereof, with two opposing sliding protrusions 221 for engaging respective sliding slots 211 located at the second outer housing 21.

The second supportive member 23, to be clamped between the second outer housing 21 and the second inner housing 22, can be screwed to the second outer housing 21 by a plurality of bolts 25 (two shown in this embodiment). The second positioning member 24, disposed on top of the second supportive member 23, protrudes out of the second outer housing 21 and the second inner housing 22, and can be screwed to the second supportive member 23 by a plurality of bolts 26 (two shown in this embodiment). The second positioning member 24 is furnished with a second-clamp-assembly bevel surface 241 at a side thereof by opposing to the first positioning member 14. The second positioning member 24 further has a receiving hole 242 for the screw bar 41 of FIG. 4 or FIG. 5 to penetrate therethrough. Details about the screw bar 41 would be elucidated thereafter.

In this disclosure, a material for producing the second outer housing 21, the second inner housing 22, the second supportive member 23 and the second positioning member 24 can be, but not limited to, a plastic or rubber material. In addition, the second supportive member 23 can be made of a metallic material with substantial stiffness.

Referring now to FIGS. 2, 4-6, the vehicle roof rack structure 1 provided by this disclosure further includes a driving member 40 for moving the second clamp assembly 20. The driving member 40 further includes a screw bar 41 and a driving block 42. The screw bar 41 passes through consecutively both the receiving holes 141 and 241 of the first positioning member 14 and the second positioning member 24, respectively. In this embodiment, the screw bar 41, the first positioning member 14 and the second positioning member 24 are not physically interfered to each other.

The driving block 42, disposed at an axial end of the screw bar 41, engages the screw bar 41 with threads 43. In addition, the driving block 42 is furnished with a driving-block bevel surface 421 to face the second-clamp-assembly bevel surface 241, in which the slope of the driving-block bevel surface 421 is approximately the same as that of the second-clamp-assembly bevel surface 241. Since the engagement between the screw bar 41 and the driving block 42 is made through the threads 43, thus, whenever the screw bar 41 rotates in either direction about a center axis of the screw bar 41, the screw bar 41 would drive the driving block 42 to displace along the center axis of the screw bar 41.

In addition, as shown in FIG. 2, the shield cover 19 can shield or cover the screw bar 41 as well as the lock 18. With the protection provided by the lock 18, unexpected moves to dis-assemble the structures via directly unscrewing the screw bar 41 can be avoided.

In this embodiment, the driving block 42 is disposed at one end of a protective plate 44, and the protective plate 44 provides thereon a plurality of tabs 441 for inserting corresponding cavities (not shown in the figure) at the driving block 42, such that the driving block 42 and the protective plate 44 can be engaged. The protective plate 44, disposed inside the engagement groove 311 of the main bar structure 31, is to mount thereon the driving block 42. Since a groove (not shown in the figure) furnished to the main bar structure 31 in a manner to meet a displacement stroke of the driving block 42 could cause substantial wind noises, thus the protective plate 44 covering the groove can avoid effectively the wind noises.

In this disclosure, materials for producing the screw bar 41, the driving block 42 and the protective plate 44 are not limited. For example, the screw bar 41 can be made of a metallic material with substantial stiffness, and the driving block 42 and the protective plate 44 can be made of a plastic or rubber material.

Figure 7:
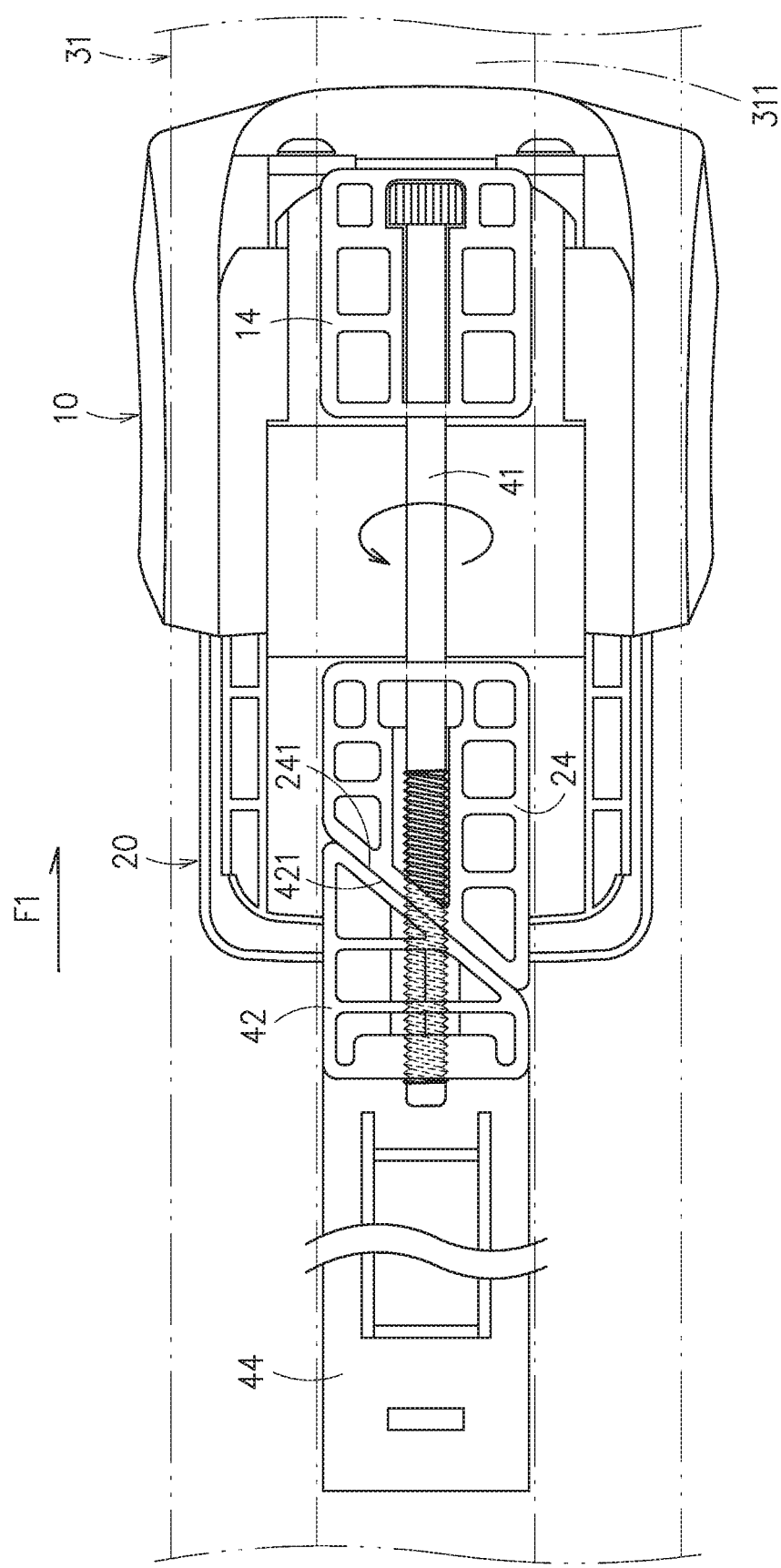
FIG. 7 is a schematic top view of the first clamp assembly and the second clamp assembly of FIG. 1 in a state of pre-clamping the vehicle-roof mounting rack (referring to FIG. 2)
Figure 8:
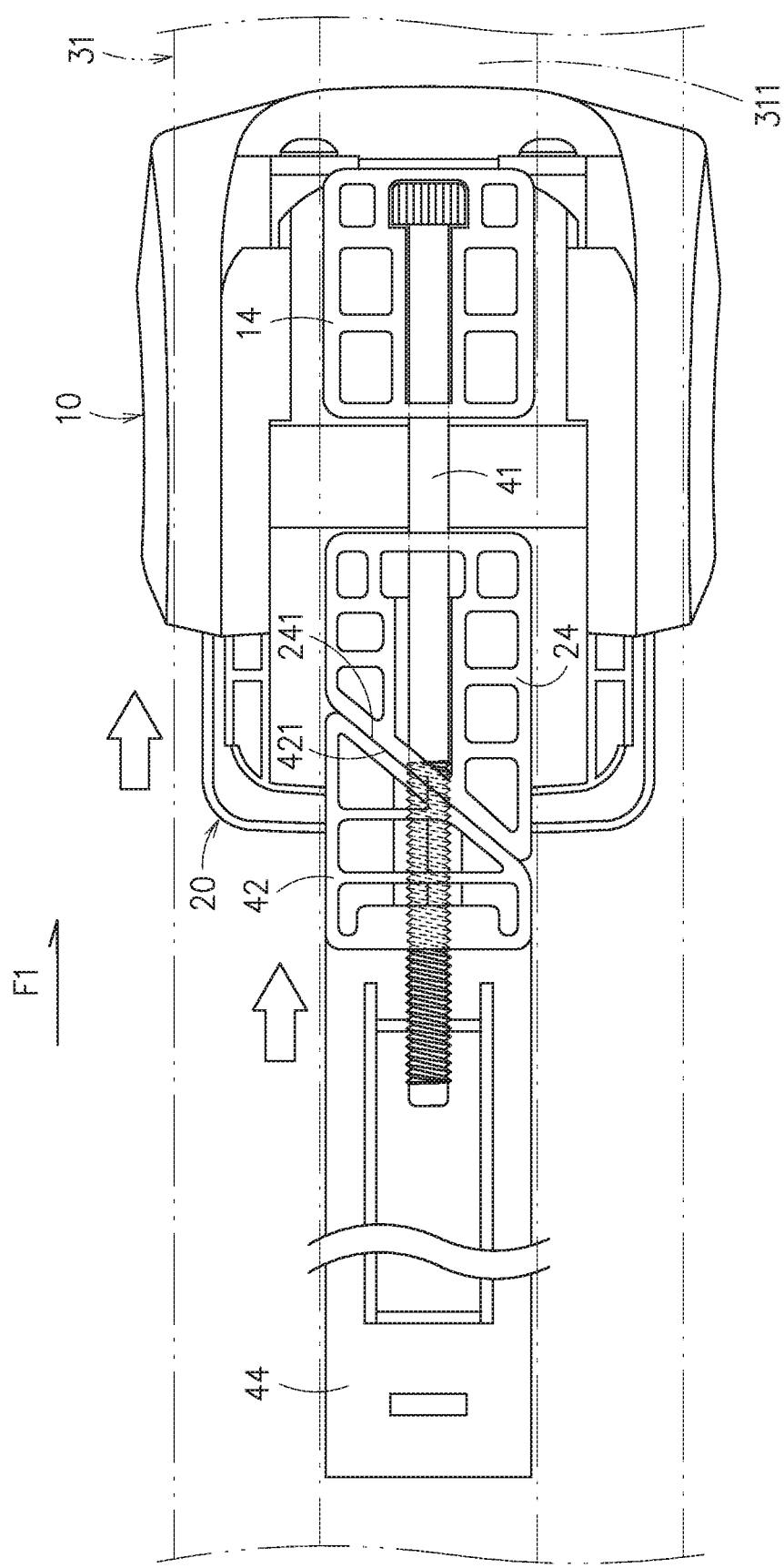
FIG. 8 is a schematic top view showing a screw bar to engage the first clamp assembly and the second clamp assembly of FIG. 1.

Referring now to FIGS. 2, 7 and 8, the first positioning member 14, the second positioning member 24, the driving block 42 and the protective plate 44 are all disposed inside the engagement groove 311 of the main bar structure 31 so as to slide along and inside the engagement groove 311 in the longitudinal direction F1.

When the screw bar 41 is rotated about the center axis by a tool such as a screw driver, the screw bar 41 can drive the driving block 42 to displace along the center axis of the screw bar 41 (i.e., in the longitudinal direction F1). As the driving-block bevel surface 421 contacts, by adhering to, the second-clamp-assembly bevel surface 241, the driving block 42 would drive the second positioning member 24 to displace, and also to displace the entire second clamp assembly 20, as shown in FIG. 8.

Figure 9:
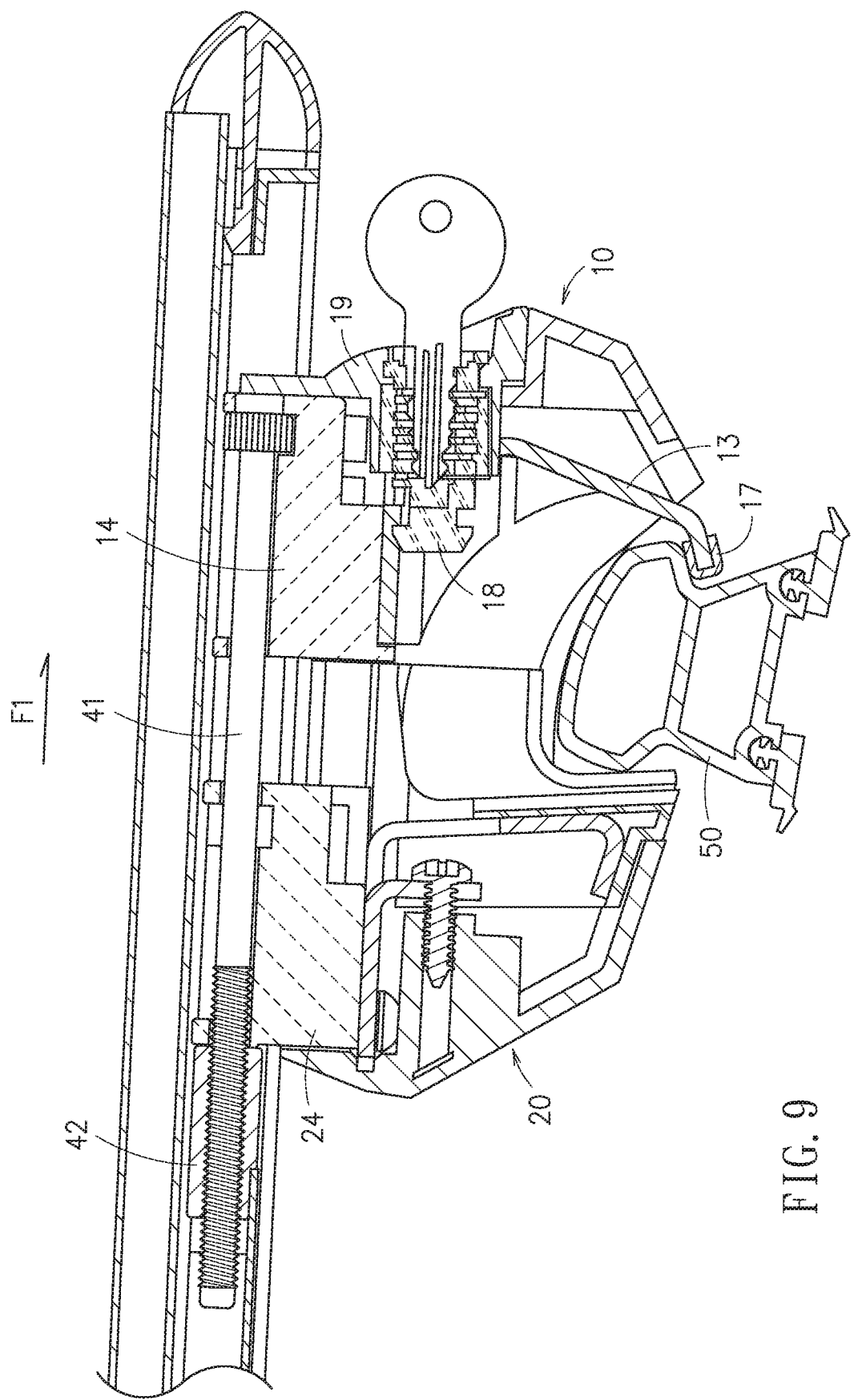
FIG. 9 is a schematic top view of the first clamp assembly and the second clamp assembly of FIG. 1 in a state of clamping the vehicle-roof mounting rack (referring to FIG. 8).

Referring now to FIG. 8 and FIG. 9, the screw bar 41 keeps rotating to have the first clamp assembly 10 and the second clamp assembly 20 to clamp the vehicle-roof mounting rack 50 in between. At this time, the side of the first supportive member 13 having the protective glove 17 would hook a bottom edge of the vehicle-roof mounting rack 50.

Through the contact pair provided by the driving-block bevel surface 421 and the second-clamp-assembly bevel surface 241 and the position constraint provided by the engagement groove 311, the driving block 42 can firmly lock the second positioning member 24 in both the longitudinal direction F1 and the transverse direction perpendicular to the longitudinal direction F1. In addition, the driving-block bevel surface 421 can contact and slide along the second-clamp-assembly bevel surface 241, and thus no self-locking would occur.

As described above, the shield cover 19 can cover the screw bar 41, and, through the protection of the lock 18, unexpected or theft moves to dis-assemble the structures via directly unscrewing the screw bar 41 can be avoided.

Similarly, in the case that the screw bar 41 is rotated reversely, then the driving block 42 would be separated from the second positioning member 24. Namely, the second clamp assembly 20 is released to separate the first clamp assembly 10 and the second clamp assembly 20 to the state shown in FIG. 2. In this state, the vehicle-roof mounting rack 50 is relieved.

In summary, by providing the vehicle roof rack structure of this disclosure, the screw bar is utilized to control the driving-block bevel surface to push or separate from the second-clamp-assembly bevel surface, and thereby effective and sufficient locking and convenient assembling/dis-assembling can be achieved.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A vehicle roof rack structure, comprising:
   a first clamp assembly, having a first positioning member;
   a second clamp assembly, disposed aside to the first clamp assembly, having a second positioning member, the second positioning member furnished with a second-clamp-assembly bevel surface at a side thereof, wherein a space for passing a vehicle-roof mounting rack is formed between the first clamp assembly and the second clamp assembly; and
   a driving member, used for driving the second clamp assembly to displace, including:
      a screw bar, passing through the first positioning member and the second positioning member;
      a driving block, disposed at an axial end of the screw bar, engaging the screw bar with threads, furnished with a driving-block bevel surface to face the second-clamp-assembly bevel surface, the driving-block bevel surface and the second-clamp-assembly bevel surface having approximately the same slope; and
   a vehicle-roof bar, having an end to mount the first clamp assembly and the second clamp assembly;
   wherein, when the screw bar rotates in either direction about a center axis thereof, the screw bar drives the driving block to displace so as to drive or release the second clamp assembly, so that the first clamp assembly and the second clamp assembly clamp or release the vehicle-roof mounting rack in between;
   wherein the vehicle-roof bar includes an engagement groove for disposing and displacing thereinside the first positioning member, the second positioning member and the driving block; and
   wherein the driving block is disposed at one end of a protective plate, and the protective plate is disposed inside the engagement groove.

2. The vehicle roof rack structure of claim 1, wherein the vehicle-roof bar includes:

a main bar structure, having a longitudinal direction, the engagement groove being constructed at a side of the main bar structure by extending thereof in the longitudinal direction;

a protective strip, having another longitudinal direction, disposed at another side of the main bar structure by opposing the engagement groove; and two end caps, furnished to two opposing axial ends of the main bar structure in the longitudinal direction, each of the two end caps having an anchoring protrusion to hook the main bar structure.

3. The vehicle roof rack structure of claim 2, wherein the vehicle-roof bar further includes two fitting members, each of the end caps is paired with one of the fitting members, and each of the fitting member includes:

two opposing flanges, matching the two anchoring protrusions; and a lip, disposed to a lower middle portion between the two flanges; wherein, by applying forcing upon the lip, the two flanges are driven to pull the anchoring protrusions so as to separate the anchoring protrusions from the main bar structure.

4. The vehicle roof rack structure of claim 1, wherein the first clamp assembly includes:

a first outer housing;

a first inner housing, engaged detachably with the first outer housing; and a first supportive member, clamped between the first outer housing and the first inner housing, the first positioning member being disposed on top of the first supportive member and protruding out of the first outer housing and the first inner housing.

5. The vehicle roof rack structure of claim 4, wherein the first clamp assembly further includes a protective glove, the protective glove is disposed at a side of the first positioning member by opposing the first supportive member, and the protective glove protrudes into the space formed by the first clamp assembly and the second clamp assembly.

6. The vehicle roof rack structure of claim 5, wherein, when the first clamp assembly and the second clamp assembly clamp the vehicle-roof mounting rack in between, a side of the first supportive member having the protective glove hooks a bottom edge of the vehicle-roof mounting rack.

7. The vehicle roof rack structure of claim 4, wherein the first outer housing further includes a lock, the lock is shielded by a shield cover, the lock is engaged with the first outer housing, and the shield cover covers the first outer housing.

8. The vehicle roof rack structure of claim 1, wherein the second clamp assembly includes:

a second outer housing;

a second inner housing, engaged detachably with the second outer housing; and a second supportive member, clamped between the second outer housing and the second inner housing, the second positioning member being disposed on top of the second supportive member and protruding out of the second outer housing and the second inner housing, the second-clamp-assembly bevel surface being disposed by opposing the first positioning member.

\* \* \* \* \*